(12) United States Patent
Norton et al.

(10) Patent No.: US 7,233,927 B1
(45) Date of Patent: Jun. 19, 2007

(54) METHOD AND SYSTEM FOR AUTHENTICATING ACCOUNTS ON A REMOTE SERVER

(75) Inventors: Paul Sterling Norton, North Bend, WA (US); Michael Wade Taute, Kent, WA (US); Tyson Murray, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 757 days.

(21) Appl. No.: 10/306,028

(22) Filed: Nov. 27, 2002

(51) Int. Cl.
*G06Q 99/00* (2006.01)
(52) U.S. Cl. ...................................................... 705/67
(58) Field of Classification Search ............ 705/64–67, 705/71–76; 713/182–785; 707/1, 104
See application file for complete search history.

(56) References Cited

U.S. PATENT DOCUMENTS

| | | | | |
|---|---|---|---|---|
| 5,963,915 A | * | 10/1999 | Kirsch ......................... | 705/26 |
| 6,144,959 A | * | 11/2000 | Anderson et al. .............. | 707/9 |
| 6,202,066 B1 | * | 3/2001 | Barkley et al. ................ | 707/9 |
| 2002/0072873 A1 | * | 6/2002 | Liu et al. ..................... | 702/119 |
| 2002/0083012 A1 | * | 6/2002 | Bush et al. ................... | 705/76 |
| 2002/0099936 A1 | * | 7/2002 | Kou et al. .................. | 713/151 |
| 2003/0023874 A1 | * | 1/2003 | Prokupets et al. .......... | 713/201 |

FOREIGN PATENT DOCUMENTS

JP    11031019 A    *    2/1999

OTHER PUBLICATIONS

Aldridge et al., "Security Considerations of Doing Business via the Internet: Cautions to be Considered", Internet Research, v7n1, 1997, pp. 9-15, ISSN: 1066-2243.*

* cited by examiner

*Primary Examiner*—Mary D. Cheung
(74) *Attorney, Agent, or Firm*—Merchant & Gould (57) ABSTRACT

A method and system are provided for authenticating accounts on a remote server. A set of unique accounts is requested from an authentication database. After the set of accounts is requested, existing data associated with the set of accounts, such as a web site, may be deleted from the remote server. The accounts are then checked out of the authentication database by retrieving a credential associated with each account in the database. The accounts are logged into the remote server using the retrieved credentials and then logged out. After logging in, the accounts maybe authorized using an authorization database.

20 Claims, 6 Drawing Sheets

METHOD AND SYSTEM FOR AUTHENTICATING ACCOUNTS ON A REMOTE SERVER

FIELD OF THE INVENTION

The invention generally relates to account authentication and, more specifically, to authenticating user accounts on a remote server in a computer system.

BACKGROUND OF THE INVENTION

With the advent of computers and distributed computing environments, including the Internet, many businesses provide computer users access to online services offering a wide variety of information and services. For example, online services may provide stock quotes, new stories, magazine and journal articles from third-party information providers, and electronic mail ("e-mail") services. Online services may also offer electronic commerce ("e-commerce") with participating merchants to users. In order for users to access many of these online services, providers may require computer users to undergo a registration process in which users submit personal information such as their name, address, date of birth, occupation, etc. In exchange for submitting their personal information, users are given an account typically consisting of a user name and password which is then authenticated by the provider to allow access to World Wide Web "web" sites hosted by the online service provider.

As the number of online services has proliferated, some providers have begun offering single signon authentication in which a user can use a single account to gain access to a number of online services. An example of a single signon authentication service is the MICROSOFT®.NET PASSPORT service from the MICROSOFT CORPORATION of Redmond, Wash. A user registering with the authentication service receives an account which, after being authenticated by an authentication server, may then be used to login to a number of participating service providers. For example, a user wishing to login to the web site of a participating service provider (such as a merchant), is redirected to the authentication server for authentication. After the user logs in the authentication server by entering a user name and password, the user is then redirected to the web site along with an attached authentication 'cookie.' The web site uses the cookie to verify that the user is already authenticated. When the user navigates to another participating site in the same domain as the site which the use is already authenticated to, the user is again redirected to the authentication server which checks for the authentication cookie and redirects the user to the site without the user having to login a second time.

Despite the advantages of authentication services, however, there is often a need to authenticate accounts to utilize online service on a web server without user intervention. For example, new online services under development by online service providers undergo testing before they are accessible by the public. Currently, however, testing requires the creation of a number of test or dummy accounts for testers that use up resources on the authentication server and may interfere with users utilizing the 'live' authentication server for accessing existing services on the web server. Testers would also have to keep track of user names and password for each account as well as be aware of when the accounts are being used by other testers. The tests themselves also require that accounts on the web server be 'clean'. That is, any data added to the web site by the account holder (such as created web pages) must be deleted so that failures can be easily reproduced. Currently, 'cleaning' requires brining the server down and reinstalling the server software resulting in users currently logged into the server being disconnected.

Therefore, in light of the above, there is a need for a method and system of authenticating accounts to utilize online services on a remote server without a username and password having to be known by a user. Moreover, there is a need for a method for cleaning accounts from the web server without disconnecting other users.

These and other features, advantages, and aspects of the present invention may be more clearly understood and appreciated from a review of the following detailed description of the disclosed embodiments and by references to the appended drawings and claims.

SUMMARY OF THE INVENTION

The present invention solves the above-described problems by providing a method and system of authenticating accounts to utilize online services on a remote server without a user having to known user names and passwords for those accounts. Moreover, a method and system are provided for provisioning accounts on a web server to allow users to create data to associated with the accounts while logged in to the server without rebooting the server.

Generally described, a method is provided for authenticating accounts on a remote server. A set of unique accounts is requested from an authentication database. The accounts are then checked out of the authentication database by retrieving a credential associated with each account in the database. The accounts are logged in to the remote server using the retrieved credentials and then logged out. Upon requesting the accounts from the authentication database, the method may also provide for determining whether any of the accounts in the database are checked out or have expired. Expired or checked out accounts are checked back in to the database before new accounts are checked out. A site identification retrieved from the remote server will be used to login to the remote server along with the retrieved credentials. The remote server may authorize the checked out accounts after they are logged in. The remote server may be a web server hosting a web site. The credentials may include a user identification.

The method provided herein also provides for provisioning and deprovisioning of accounts on the remote server. In particular, after requesting an account from the authentication database, a user may elect to have existing data associated with the set of accounts, such as a web site, is deleted from the remote server. After the existing data is deleted, new data may be created for the accounts on the remote server. The user may then be presented with a clean account upon login to perform testing or other tasks logs in to an account.

Embodiments of the present invention also provide a system and computer-readable medium for authenticating accounts on a remote server in a computer system. Additional details regarding various aspects of the present invention will become apparent from the detailed description of the invention that follows.

DETAILED DESCRIPTION

As described briefly above, embodiments of the present invention provide a method and system for authenticating an account on a remote server. In the following detailed description, references are made to the accompanying drawings that form a part hereof, and in which are shown by way of illustration specific embodiments or examples. Referring now to the drawings, in which like numerals represent like elements through the several figures, aspects of the present invention and the exemplary operating environment will be described.

Figure 1:
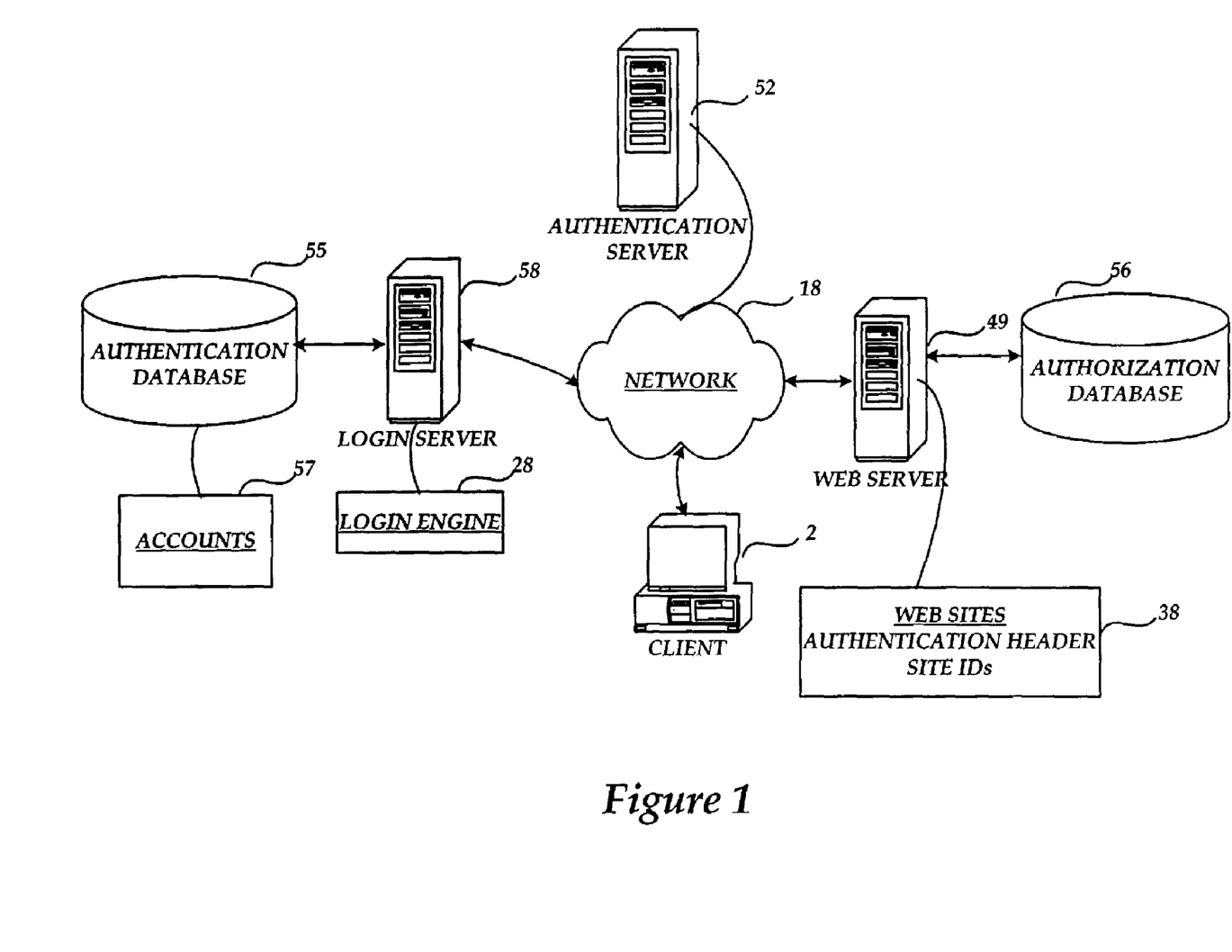
FIG. 1 is a network diagram illustrating a client-server architecture for use in conjunction with various embodiments of the invention.

FIG. 1 is a network diagram illustrating a client-server architecture for use in conjunction with various embodiments of the invention. The client computer 2 is a conventional personal computer connected to a login server 58, an authentication server 52, and a web server 49 through network 18, which may be the Internet.

The login server 58 contains an authentication database 55 for storing a predefined number of unique user accounts 57 for accessing the web server 49 through the authentication server 52. Each user account 57 in the authentication database 55 contains a credential which uniquely identifies each account. In one embodiment, the credential is a user identifier ("user ID") that uniquely identifies a user. The user ID may represented as a text string (such as an e-mail address). Other methods of identifying accounts may also be utilized.

The client computer 2 stores a login engine 28 implementing methods, properties, and objects for logging one or more of the accounts 57 in the web server. The login engine 28 also may implement methods for provisioning a user account and for authorizing a user account to access the web server 49. In one embodiment, the login engine 28 may be a dynamic link library (DLL) which is run from the client machine. The authentication server 52 receives one or more of the user accounts 57 stored in the authentication database 55 from the login server 58 and authenticates them for accessing one of the web sites 38 hosted by the web server 49. The user accounts are credentials stored in the authentication database 55. Each web site hosted by the web server 49 may contain an authentication header and a site id for identifying the web site to the authentication server 52. The web server 49 also includes an authorization database 56 for authorizing accounts after they have been authenticated. The authorization database 56 may be, for example, a User Profile Store (UPS) database or some other database. The Web server 49 uses the authorization database 56 to determine if a user is authorized to utilize services provided by the web server. For example, if the web server 49 hosts a fee-based web service, the server would access the authorization database 56 to determine whether the user had paid the required fee to utilize the service. Additional details regarding the authentication database 55, the login engine 28, and the operation of client computer 2, will be described in greater detail below with respect to FIGS. 2–4.

Figure 2:
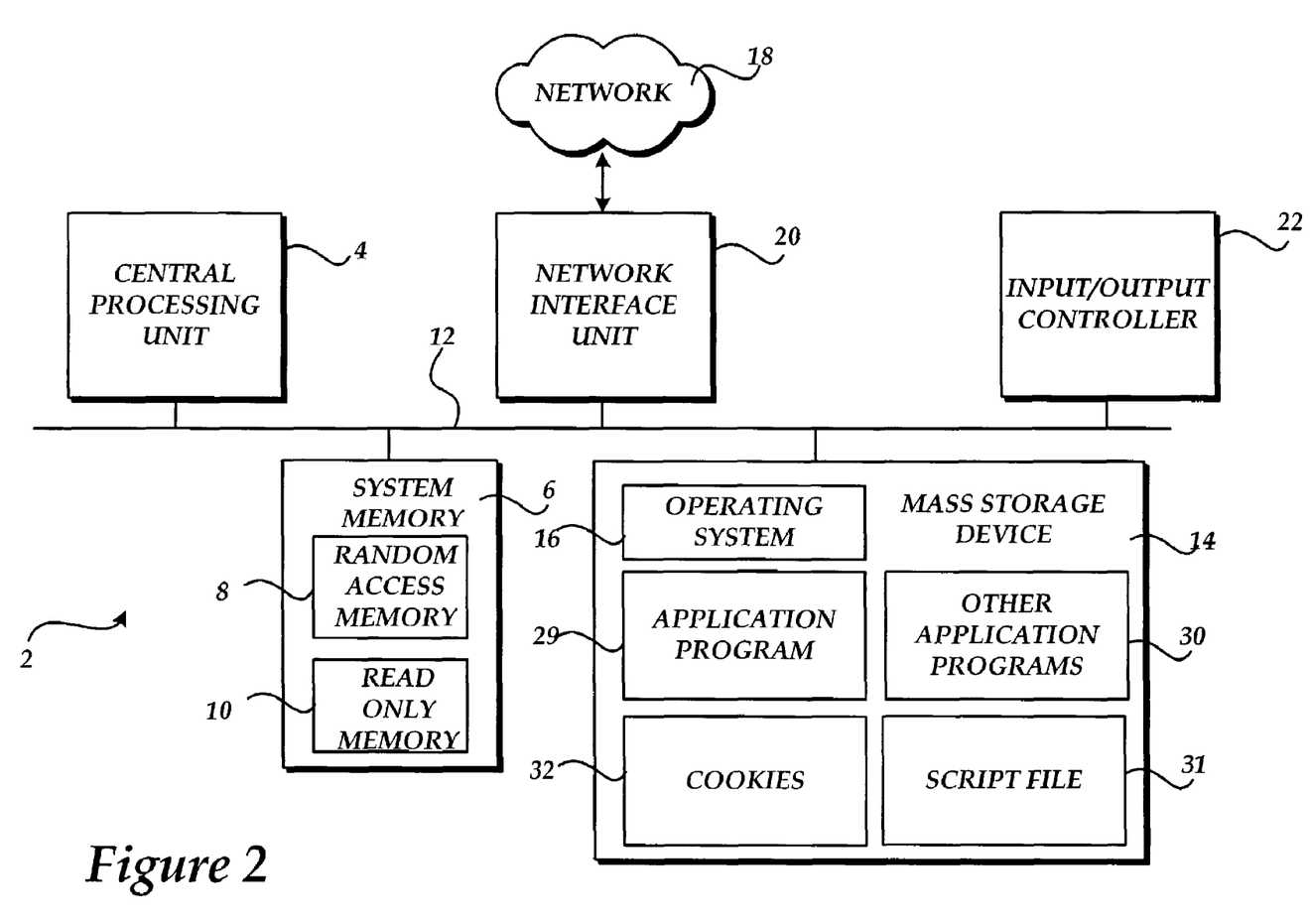
FIG. 2 is a block diagram showing an illustrative computer architecture for a computer utilized by the various embodiments of the invention.

FIG. 2 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including handheld devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computer environment, program modules may be located in both local and remote memory storage devices.

Turning now to FIG. 2, an illustrative computer architecture for the personal computer 2 which was discussed briefly above, for practicing the various embodiments of the invention will be described. The computer architecture shown in FIG. 2 illustrates a conventional personal computer, including a central processing unit 4 ("CPU"), a system memory 6, including a random access memory 8 ("RAM") and a read-only memory ("ROM") 10, and a system bus 12 that couples the memory to the CPU 4. A basic input/output system containing the basic routines that help to transfer information between elements within the computer, such as during startup, is stored in the ROM 10. The personal computer 2 further includes a mass storage device 14 for storing an operating system 16, the application program 29, script file 31, cookies 32, and other application programs 30.

The mass storage device 14 is connected to the CPU 4 through a mass storage controller (not shown) connected to the bus 12. The mass storage device 14 and its associated computer-readable media, provide non-volatile storage for the personal computer 2. Although the description of computer-readable media contained herein refers to a mass storage device, such as a hard disk or CD-ROM drive, it should be appreciated by those skilled in the art that computer-readable media can be any available media that can be accessed by the personal computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the personal computer 2 may operate in a networked environment using logical connections to remote computers through the network 18. The personal computer 2 may connect to the network 18 through a network interface unit 20 connected to the bus 12. It should be appreciated that the network interface unit 20 may also be utilized to connect to other types of networks and remote computer systems. The personal computer 2 may also include an input/output controller 22 for receiving and processing input from a number of devices, including a keyboard, mouse, or electronic stylus (not shown in FIG. 1). Similarly, an input/output controller 22 may provide output to a display screen, a primer, or other type of output device.

As mentioned briefly above, a number of program modules and data files may be stored in the mass storage device 14 and RAM 8 of the personal computer 2, including an operating system 16 suitable for controlling the operation of a networked personal computer, such as the WINDOWS 2000 operating system from MICROSOFT CORPORATION of Redmond, Wash. The mass storage device 14 and RAM 8 may also store one or more application programs.

Figure 3:
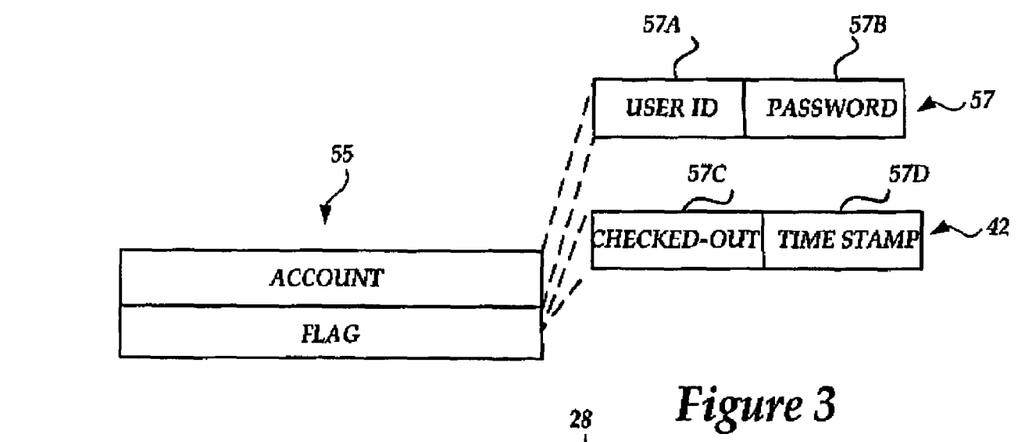
FIG. 3 is a data structure diagram illustrating the structure of a database record utilized in the various embodiments of the present invention.

Turning now to FIG. 3, additional details regarding the structure and contents of the authentication database 55 will be described. As shown in FIG. 3, the authentication database 55 includes one or more accounts 57 and a flag 42. Each account 57 includes a set of credentials comprising user ID data 57A and password data 57B for identifying the user account 57. As will be discussed in greater detail below, the credentials from the user account 57 are sent to the authentication server 52 to login to the web server 49.

The flag 42 includes checked-out data 57C and time stamp data 57D. As will be discussed in greater detail below, the flag 42 is used to indicate the status of an account in the authentication database 55. For example, checked-out data 57C includes an indication (e.g., true or false) whether or not an account is checked out of the database. Time stamp data 57D includes time and date data indicating when an account was checked-out of the database and may also include an expiration data indicating when the accounts expires.

Figure 4:
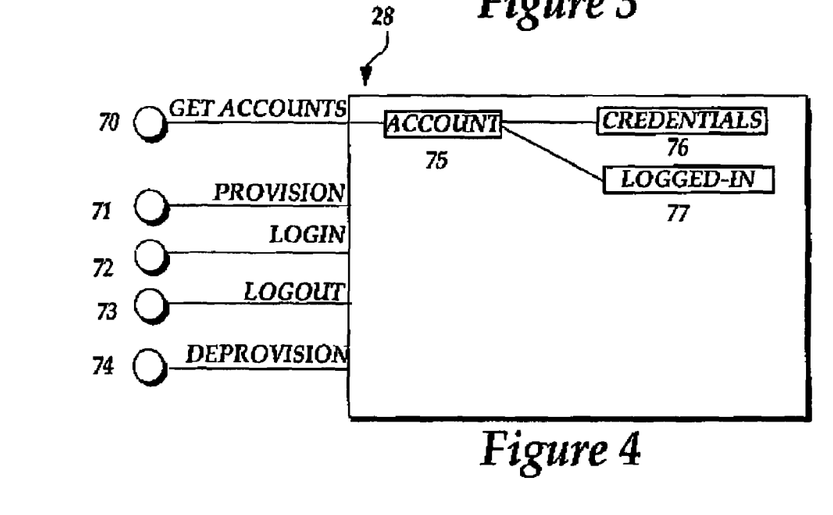
FIG. 4 is a diagram of an object-oriented process for implementing methods used in various embodiments of the invention.

Turning now to FIG. 4, additional details regarding the structure and contents of the login engine 28 will be described. As described above, the login engine 28 implements methods, properties, and objects for logging one or more of the accounts 57 in the web server 49. The login engine 28 also may implement methods for provisioning a user account and for authorizing a user account to access the web server 49. In one embodiment, the login engine 28 may be a Component Object Model or COM object which is called by an application program or scrip file to execute a series of instructions contained in methods, properties, and objects. In other embodiments, the login engine 28 may be a dynamic link library (DLL) or some other program module.

As shown in FIG. 4, the login engine 28 includes a Get Accounts method 70 for requesting and checking out one or more accounts 57 from the authentication database 55. As will be described in further detail below, the Get Accounts 70 method is also implemented by the login engine 28 to call an API for authorizing requested accounts for accessing the web server 49. The Get Accounts method 70 includes an Account object 75 used to gather data associated with a single account. The Account object 75 retrieves the account data from the credentials property 76 (which may include a user ID and password). The Account object 75 also includes the Logged-In property 77 for determining whether or not a user is currently logged in the authentication server 52.

The login engine 28 also includes a Provision method 71 for provisioning an account after it has been checked out of the authentication database 55. As will be described in further detail below, the Provision method 71 adds data to an account on the web server 49. For example, the Provision method 71 may create a new web site to be accessed by the user of the account upon login.

The login engine 28 also includes a Login method 72 for logging in an account to the web server 49 via the authentication server 52. Similarly, the Logout method 73 logs an account lout of the web server 49. Finally, the Deprovision method 74 deprovisions any data added to the web server 49 by the Provision method 71. The Deprovision method 74 will also deprovision any data added after the Provision method 71 was called. For example, the Deprovision method 74 may delete a web site provisioned for the user for testing when the user requested an account.

Figure 5:
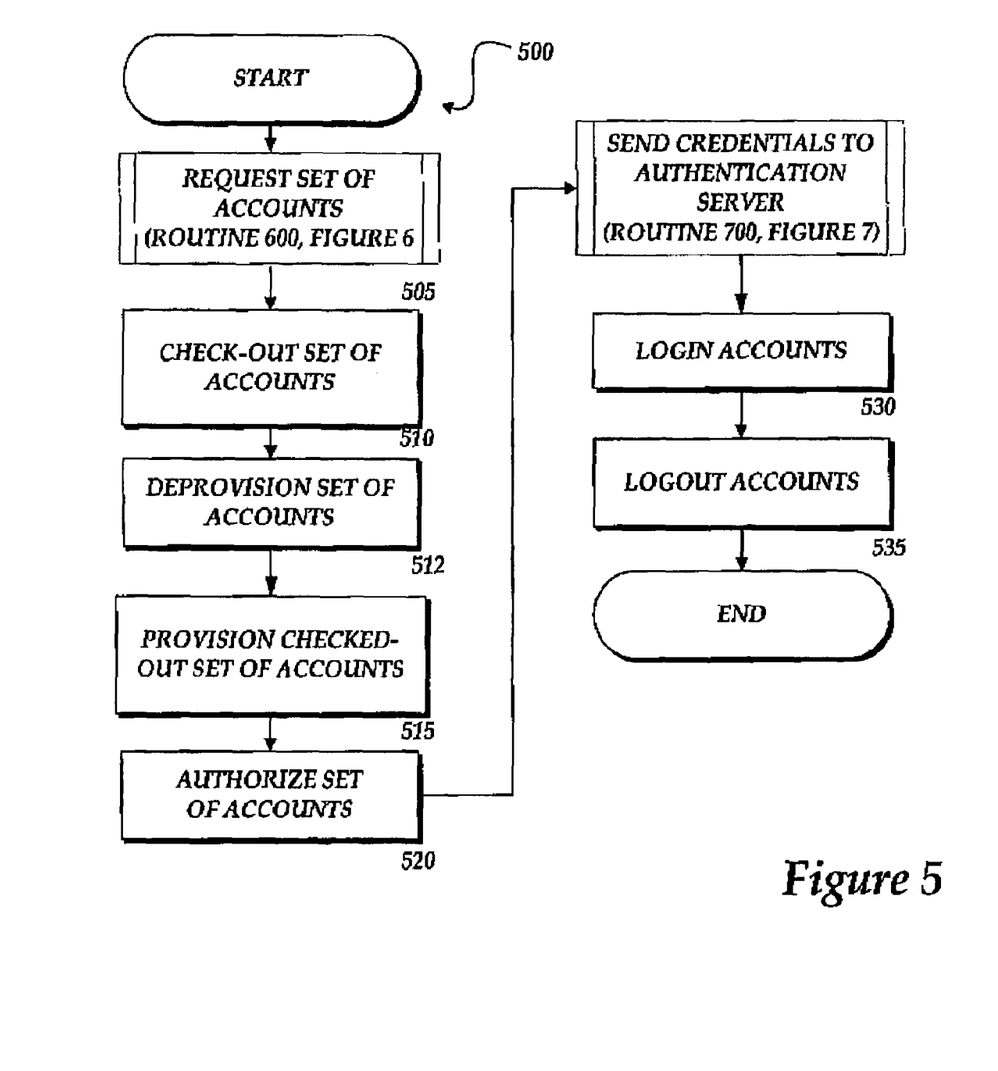
FIG. 5 is a flow diagram showing an illustrative routine for authenticating accounts on a web server according to various embodiments of the invention.

Referring now to FIG. 5, an illustrative routine 500 will be described for authenticating one or more accounts on the web server 49 utilizing the login engine 28 discussed above with respect to FIGS. 1–4. The routine 500 begins at block 505, wherein the Get Accounts method 70 requests a set of user accounts 57 from the authentication database 55 to login to the web site 38. One or more of the user accounts 57 may be included in the request to the authentication database 55. An illustrative routine 600 for requesting accounts from the authentication database 55 will be described in more detail with respect to FIG. 6 below.

The routine 500 then continues to block 510, where the requested set of user accounts is checked-out of the authentication database 55. As discussed above, each account contains a unique credential 76 identifying the account 57. In an alternative embodiment, the web server 49 may also require a site ID, in addition to the credential, for authenticating an account. The authentication server 55 may include a list of site IDs for participating web sites requiring authentication.

The routine 500 then continues to block 512, where the login engine 28 implements the Deprovision method 74 to deprovision the accounts 57 on the web server 49 by deleting any existing data associated with the accounts. For example, deprovisioning may delete a wet site on the web server. This is advantageous to testers and developers of web sites who require 'clean' accounts to test online services. Deprovisioning allows users to clean their accounts without having to reboot the server.

The routine 500 continues to block 515, where the login engine 28 implements the Provision method 71 to provision the checked-out set of accounts 57 on the web server 49. When the web server 49 is provisioned, data may be added to the accounts on the web server. For example, provisioning may create a new web site to be accessed by the user of the account upon login. In one embodiment, provisioning is implemented by calling ASPX pages on the web server 49 to perform this operation. It should be understood that other methods, objects, or properties may also be implemented to provision an account on the web server 49. It should also be understood that the provisioning of accounts is optional and may be performed after the set of accounts is logged in to the web server 49 or may not be performed at all if it is not required that a user have a 'clean' account.

The routine 500 then continues to block 520, where the login engine 28 implements the Get Accounts method 70 to authorize the set of checked-out accounts 57. In one embodiment, the accounts 57 are authorized by creating a cache in the User Profile Store (UPS) using the UPS API. The cache may be based on the account credentials and contains a formatted array containing the authorization data. In this embodiment, each credential will contain its own authorization data in the UPS namespace. As discussed briefly above, the web server 49 accesses the authorization database 56 after account login to determine whether the account is authorized to access services hosted by the web server 49. It should be understood that the authorization of accounts is optional and may not be performed if not required by the web server 49.

The routine 500 then continues to block 525, where the login engine 28 sends the credentials to the authentication server 52 for authentication. In one embodiment, the site ID of the web server 49 may also be submitted if required for authentication by the authentication server 52. Upon receiving the credentials (and if applicable, the site ID), the authentication server 52 confirms the credentials sends an authentication cookie 32 for each checked-out account to the client computer 2. The login engine 28 then implements the Login method 72 to login the set of accounts in the web server 49 using the authentication cookies 32 at block 520. An illustrative routine 700 for logging in the user accounts 57 will be described in more detail with respect to FIG. 7 below.

After the accounts have been logged in and authorized to the web server 49, users may perform a variety of tasks. For example, the accounts may be used to test new online services which ill be hosted by the web server. Tests may include such tasks as creating personalized web sites on the web server or opening a web page on an existing site. Other tasks may also be performed while the accounts are logged in.

The routine 500 continues from block 530 to block 535, where the login engine 28 implements the Logout method 73 to logout the set of accounts from the web server 49. In one embodiment, the Logout method 73 logs out the accounts by expiring the same authentication cookies used to login the set of accounts.

Figure 6:
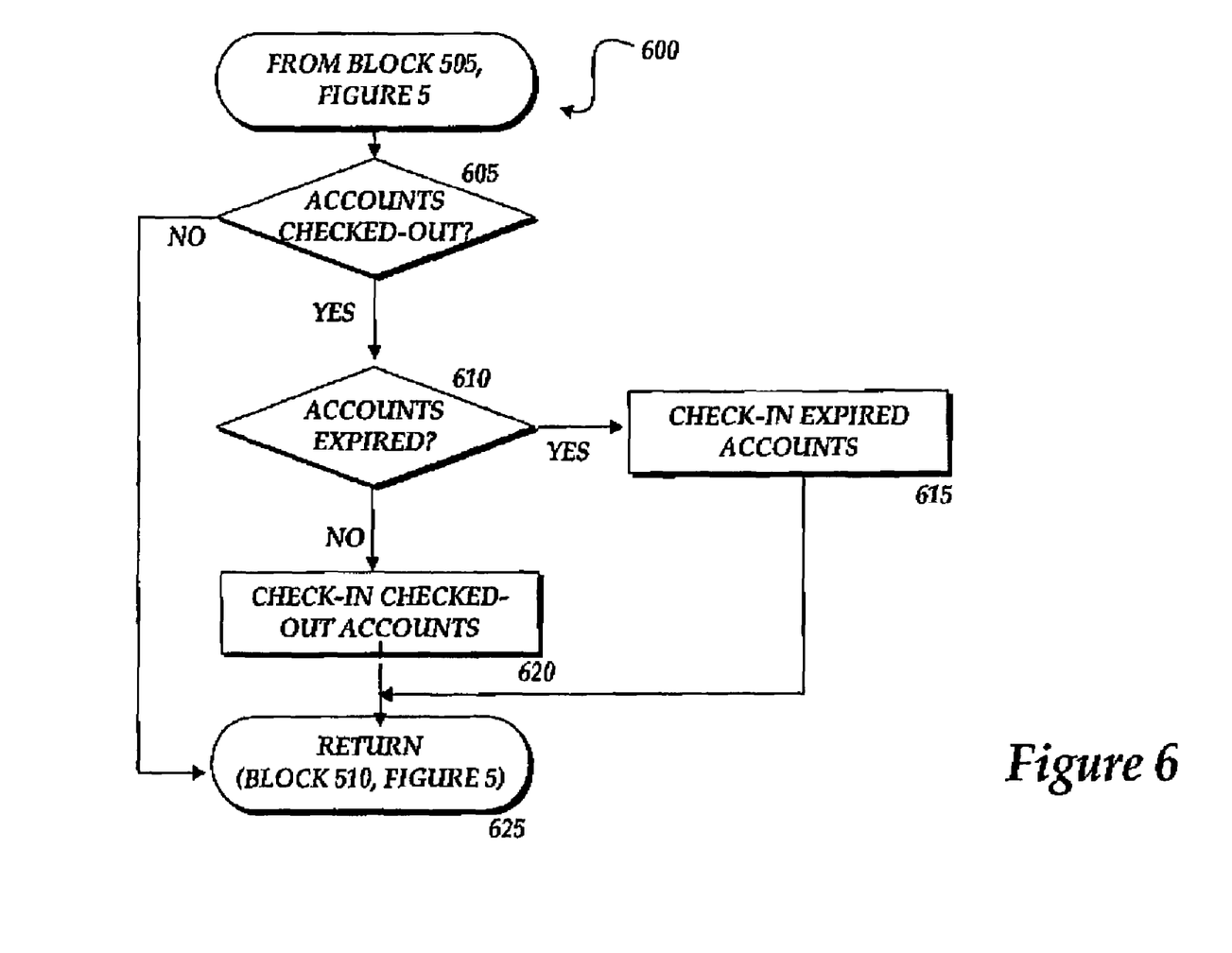
FIG. 6 is a flow diagram showing an illustrative routing for requesting a set of accounts from an authentication server according to one embodiment of the invention.

Referring now to FIG. 6, an illustrative routine will be described for requesting a set of accounts from the authentication database 55. The routine 600 begins at block 605, where the login engine 28 determines whether any accounts are currently checked out to the user by searching for the check-out flag 57C in the authentication database 55. Each time an account is checked out of the authentication database 55, the flag 57C is set for the checked-out account. If no flags are found, the routine returns to block 510 of FIG. 5 at block 625. Conversely, if one or more flags 57C are found in the authentication database 55 (indicating one or more accounts are currently checked out), it is determined whether any of the accounts have expired at block 610. Accounts in the authentication database 55 may be time sensitive and set to expire at the end of a predetermined time period indicated on the time stamp 57D issued to the account when it is checked-out. Expiration is determined by examining the time stamp 57D. For example, if a checked-out account has a time stamp of Jun. 6, 2002, it will expire unless it is checked back in before Jun. 7, 2002.

If, at block 610, the login sever 58 determines that any of the checked-out accounts have expired, the routine 600 continues to block 615, where the expired accounts are checked back in to the authentication database 55. Once the accounts are checked-in, the checked-out flag 57C is deleted and the time stamp 57D is also removed. From blocked 615 the routine 600 returns to block 510 of FIG. 5 at block 625.

Conversely, if it is determined that none of the checked-out accounts have expired, the routine continues to block 620, where the checked-out accounts are checked back in to the authentication database 55. From block 200 the routine 600 then returns to block 510 of FIG. 5 at block 625. Checking in the "older" accounts ensures that a user always receives a fresh set of accounts upon request, enabling the use of time sensitive accounts for a longer period of time.

Figure 7:
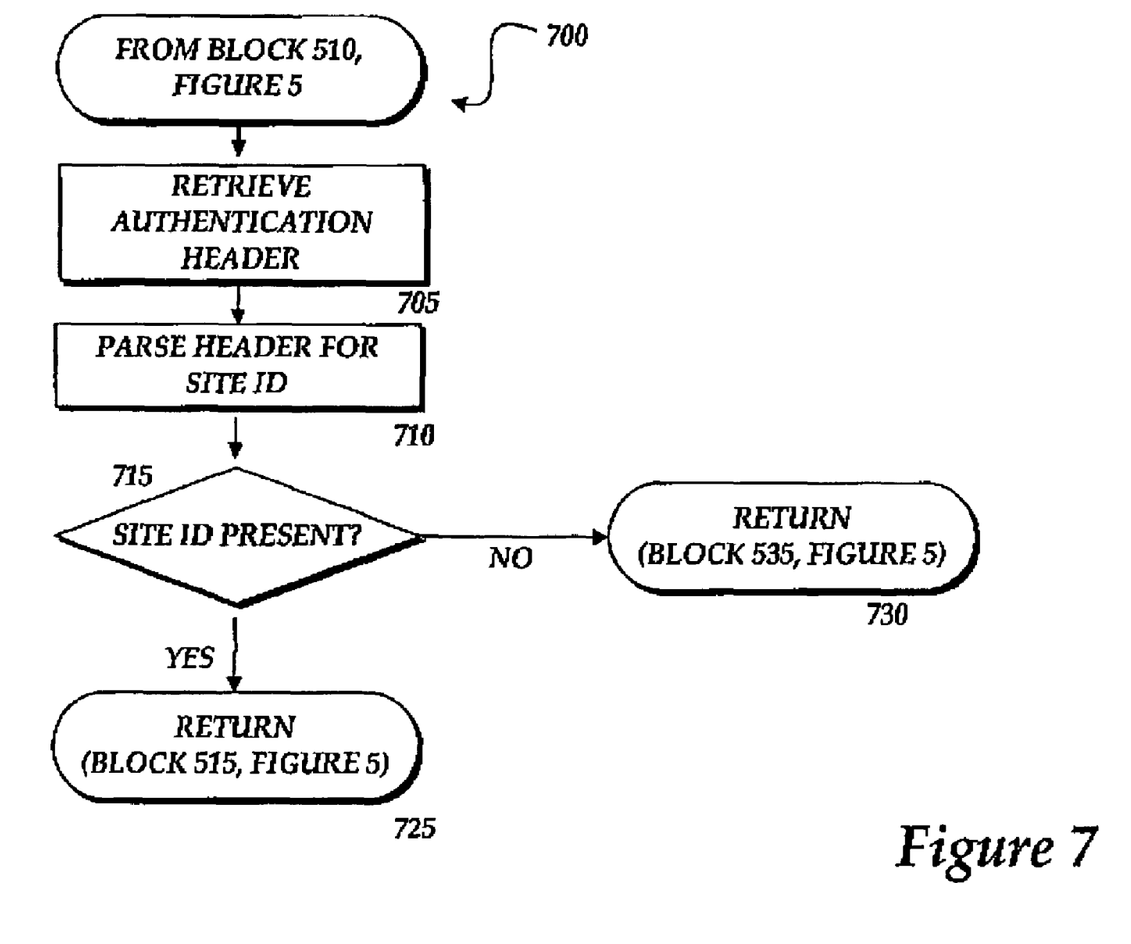
FIG. 7 is a flow diagram showing an illustrative routine for logging in an account to a web server according to the illustrative routine of FIG. 5.

Referring now to FIG. 7, an illustrative routine 700 will be described for logging in an account into the web server 49. The routine 700 begins at block 705, where the login engine 28 retrieves an authentication header from the web server 49. From block 705, the routine 700 continues to block 710, where the authentication header is parsed for the site ID. At block 715, a determination is made as to whether a site ID is present in the authentication header. If at block 715 it is determined that the site ID is present in the authentication header, the routine 700 returns to block 515 of FIG. 5 at block 725. If at block 715 it is determined that the site ID is not present in the authentication header, then it is determined that at least one checked-out account is already logged in to the web server 49. The routine 700 then returns to block 535 of FIG. 5 at block 730.

As described above, accounts may be authenticated to utilize online services on a remote server without a having to known a user name and password for those accounts. The accounts may also be provisioned on a web server to allow users to create data to associate with the accounts while logged in to the server without rebooting the server.

Other methods and objects may also be used to carry out these instructions. It will be apparent to those skilled in the art of the various modifications or variations may be made in the present invention without departing from the scope or spirit of the invention. Other embodiments of the invention will be apparent to those skilled in the art from consideration of the specification and practice of the invention disclosed herein.

We claim:

1. A method for authenticating an account on a remote server, comprising:
   requesting a set of unique accounts from a plurality of predefined user accounts stored in an authentication database, wherein a requesting user is not required to have administrative privileges;
   checking out the set of accounts from the authentication database by retrieving a credential associated with each account from the authentication database;
   logging the set of accounts into the remote server using the credentials;
   logging the set of accounts out of the remote server;
   determining if the set of accounts are clean and thus, clear of the data previously added in association with the set of accounts, wherein if the set of accounts are not clean, deprovisioning the checked out set of accounts on the remote server; and
   provisioning the checked out set of accounts on the remote server.

2. The method of claim 1, further comprising:
   authorizing the set of accounts to access the remote server.

3. The method of claim 1, wherein deprovisioning the checked out set of accounts comprises deleting existing content for the checked out set of accounts on the remote server.

4. The method of claim 1, wherein provisioning the checked out set of accounts comprises creating new content for the checked out set of accounts on the remote server to provision the set of accounts.

5. The method of claim 1, wherein requesting a set of unique accounts comprises:
    determining whether any of the accounts stored in the authentication database are currently checked out to a user;
    if any of the accounts are checked out to the user, determining whether any of the checked out accounts have expired; and
    if none of the accounts are checked out by the user, requesting the set of accounts from the authentication database.

6. The method of claim 1, further comprising retrieving a site identification from the remote server.

7. The method of claim 6, wherein retrieving a site identification from the remote server comprises:
    retrieving an authentication header from the remote server;
    parsing the authentication header for the site identification; and
    if the authentication header has a site identification, retrieving the site identification.

8. The method of claim 6, wherein logging the set of accounts into the remote server comprises:
    sending the retrieved credentials and the retrieved site identification to an authentication server; and
    receiving an authentication cookie from the authentication server for each account in the set of accounts.

9. The method of claim 1, wherein logging the set of accounts out of the remote server comprises sending a request to the authentication server to expire the authentication cookies for the set of logged in accounts.

10. The method of claim 1, wherein the set of unique accounts comprises at least one user account.

11. The method of claim 1, wherein the credentials comprise a user identification.

12. The method of claim 1, wherein the remote server is a web server hosting a web site having a plurality of web pages.

13. The method of claim 1, wherein the credentials do not include a user ID and password.

14. The method of claim 1, wherein the requesting user is not required to known user names and passwords for the plurality of predefined user accounts.

15. The method of claim 1, wherein deprovisioning allows users to clean their accounts without having to reboot the remote server.

16. A computer-readable medium comprising computer-executable instructions which, when executed by a computer, cause the computer to perform the steps of:
    requesting a set of unique accounts from a plurality of predefined user accounts stored in an authentication database for logging into a web server, wherein a requesting user is not required to have administrative privileges;
    checking out the set of accounts from the authentication database retrieving a credential associated with each account from the authentication database;
    retrieving a site identification from the web server;
    determining if the set of accounts are clean thereby clear of data previously added in association with the set of accounts, wherein if the set of accounts are not clean,
        deprovisioning the checked out set of accounts on the web server without disconnecting users of the web server; and
        provisioning the checked out set of accounts on the web server;
    authorizing the set of accounts to utilize services hosted on the web server;
    logging the set of accounts into the web server using the credentials and the site identification; and
    logging the set of accounts out of the web server.

17. The computer-readable medium of claim 16, wherein requesting a set of unique accounts comprises:
    determining whether any of the accounts stored in the authentication database are currently checked out to a user;
    if any of the accounts are currently checked out to the user, determining whether any of the checked out accounts have expired; and
    if none of the accounts are currently checked out by the user; requesting the set of accounts from the authentication database.

18. The computer-readable medium claim 17, wherein retrieving a site identification from the web server comprises:
    retrieving an authentication header from the remote server;
    parsing the authentication header for the site identification; and
    if the authentication header has a site identification, retrieving the site identification.

19. The computer-readable medium of claim 17, wherein logging the set of accounts into the remote server comprises:
    sending the retrieved credentials and the retrieved site identification to an authentication server;
    receiving an authentication cookie from the authentication server for each account in the set of accounts; and
    logging the set of accounts into the remote server using the authentication cookie received from the authentication server.

20. The computer-readable medium of claim 17, wherein logging the set of accounts out of the remote server comprises sending a request to the authentication server to expire the authenitcation cookies for the set of logged in accounts.

* * * * *